United States Patent [19]

Nobakht et al.

[11] Patent Number: 5,692,011
[45] Date of Patent: Nov. 25, 1997

[54] DUAL DECISION EQUALIZATION APPARATUS

[75] Inventors: Ramin Nobakht; Jeyhan Karaoguz, both of Raleigh, N.C.

[73] Assignee: International Business Machines Corporation, Armonk, N.Y.

[21] Appl. No.: 633,253

[22] Filed: Apr. 18, 1996

Related U.S. Application Data

[63] Continuation of Ser. No. 259,850, Jun. 15, 1994, Pat. No. 5,539,774.

[51] Int. Cl.$^6$ ............................................... H03H 7/30
[52] U.S. Cl. ........................ 375/233; 375/341; 375/348; 364/724.2; 333/18
[58] Field of Search .............................. 375/266, 343, 375/346, 348, 229, 230, 232, 233, 341, 349, 350; 364/724.19, 724.2; 329/351; 333/18, 28 R

[56] References Cited

U.S. PATENT DOCUMENTS

| | | | |
|---|---|---|---|
| 4,504,958 | 3/1985 | Tamburelli | 375/230 |
| 5,031,195 | 7/1991 | Chevillat et al. | 375/234 |
| 5,327,458 | 7/1994 | Yamamoto | 375/230 |
| 5,353,307 | 10/1994 | Lester et al. | 375/233 |
| 5,481,565 | 1/1996 | Pal | 375/232 |
| 5,506,871 | 4/1996 | Hwang et al. | 375/230 |
| 5,513,215 | 4/1996 | Marchetto et al. | 375/233 |
| 5,513,216 | 4/1996 | Gadot et al. | 375/233 |
| 5,517,527 | 5/1996 | Yu | 375/233 |
| 5,561,687 | 10/1996 | Turner | 375/233 |
| 5,572,503 | 11/1996 | Satoh et al. | 369/124 |

Primary Examiner—Wellington Chin
Assistant Examiner—William Luther
Attorney, Agent, or Firm—John D. Flynn

[57] ABSTRACT

An adaptive equalization method and device which provides for the equalization of symbol sequences sent through fading multipath channels with time and frequency dispersion. By using a trainer system to supply an estimate of the received symbol sequence to a trainee system, equalization of the received symbol sequences is accomplished without the need for training sequences and with the ability of compensating for spectral nulls without a substantial increase in the noise in the system. The trainer system is configured as a decision directed equalizer with a feed forward filter having the received symbol sequence as input and connected to a decision element that outputs decided symbols. The trainee system is similar to decision feed back equalization in that it has a feed forward filter, a feedback filter and a decision element but, differs in that the input to the feed back filter is provided by the trainer system. The feed forward filter of the trainee system takes received symbol sequence as input. The output of the feed forward filter and the feedback filter of the trainee system is provided to the decision element which outputs the equalized symbol sequences.

4 Claims, 11 Drawing Sheets

DUAL DECISION EQUALIZATION APPARATUS

This is a continuation of application Ser. No. 08/259,850 filed on 15 Jun. 1994, now U.S. Pat. No. 5,539,774.

BACKGROUND OF THE INVENTION

1. Related Patent Applications

U.S. patent application Ser. No. 07/846,651 filed Mar. 5, 1992, entitled "System and Method of Estimating Equalizer Performance in the Presence of Channel Mismatch", IBM Docket No. EN992026 and U.S. patent application Ser. No. 07/866,928 filed Apr. 10, 1992, entitled, "System and Method of Robust Sequence Estimation in the Presence of Channel Mismatch Conditions" IBM Docket No. EN992057, both assigned to the same assignee as the present invention.

2. Field of the Invention

The present invention relates to a device and method for performing adaptive equalization in a communications system. In particular, the present invention provides for blind or referenced trained adaptive equalization for use in digital communication systems.

3. Description of the Prior Art

In communications systems multiple reflections lead to a confluence at a receiver of several signals which all stem from the same signal generated at a transmitter but differ in arrival time, carrier phase and amplitude. This can impair the transmission performance and cause fading or even signal elimination at the receiver. These so-called multipath effects particularly appear in urban environments which are at the same time those areas with the highest demand for communication systems. The relative motion of the receiver with respect to the transmitter and/or the transmitter with respect to the receiver can cause a doppler effect which can cause fading which also impairs transmission performance. These effects are particular troublesome with mobile communication systems. Mobile channels are generally characterized as fading multipath channels with time dispersion (multipath spreads). The mobility of such systems creates transmission channel characteristics that are constantly changing as the geometries, transmission path, interference and transmission medium change.

The high bit or data rates of modern digital mobile radio systems cause a significant part of the typical multipath effects to appear as inter-symbol interference (ISI). Because of the non-ideality of the frequency response of the transmission channel, each transmitted symbol interferes with the others, generating ISI. To remove the inter-symbol interference, the systems are usually equipped with equalizers (see Lucky R. W., "Automatic equalization for digital communication", Bell System Technical Journal, 1965, 44, pp. 574-588). Equalizers are widely used in communications systems and can employ either dedicated hardware or a programmable digital signal processors (DSP) or DSPs. There are two primary types of equalizers: linear and non-linear. Both types of equalizers can be classified as either reference trained or blind. Both types of equalizers typically utilize an adaptive filter. The adaptive filter, often referred to as transversal filter or moving average filter, is made with a chain of delay elements, at the output of each of which is placed a variable gain amplifier (tap gain). The variable tap gains are usually referred to as adjustable coefficients. The outputs of the variable tap gain amps are then added to provide a signal sample which gives an indication of the transmitted symbol. This signal sample is then sent to a decision element or symbol detector to obtain a decided symbol. Assuming no errors, the decided symbol should be equal to the symbol fed into the transmission channel by the transmitter.

By appropriate selection of the delay elements and the coefficients, equalizers can reduce the inter-symbol interference according to a given criterion. Some types of equalizers, referred to as adaptive, provide for automatic coefficient adjustment. In these equalizers, starting from arbitrary initial coefficients often quite far from the optimum, the coefficients can be modified iteratively until an optimal configuration is reached. To minimize inter-symbol interference many adaptive equalization systems adopt the criterion of minimizing the mean square error (MSE) defined from the signal samples at the adaptive filter output before the decision element and the corresponding transmitted signals using estimated gradient methods. For a given transmission channel, the mean square error is a quadratic function of the tap gains for referenced trained adaptive filters. The mean square error is minimized by estimating its gradient with respect to the filter coefficients. The filter coefficients are modified in the direction opposite to the estimated gradient.

More particularly, starting from arbitrary tap gain values, differences are found between the transmitted reference symbols and the signal samples at the equalizer output. Using these differences, in combination with the signals present at the equalizer input, the tap gains are modified to obtain the minimum mean square error. It can be shown that a tap gain configuration which minimizes the mean square error exists and is unique (see Gersho A., "Adaptive equalization of highly dispersive channels for data transmission", Bell System Technical Journal, 1969, 48, pp. 55-70). When the optimum configuration has been reached the outputs of the receiver decision element, i.e. the self-decided symbols, are correct with very high probability and can be used instead of the reference symbols to obtain the present value of the error to be used in the adaptation process. Many other coefficient adjustment schemes have been suggested. The basic assumption for the adaptive equalizer is therefore that the current output samples for the adaptive equalizer can be compared with the corresponding transmitted symbols, which have to be known a priori.

However, if the channel characteristics change during transmission, as is particularly the case with mobile systems, the self-decided symbols may become incorrect and the equalizer is unable to reconfigure the tap gains to the new optimum values. In this case, to obtain reliable self-decided symbols at the receiver output, the above described start-up procedure (i.e., the transmitted reference sequence and adjustment of the coefficient) must be repeated with considerable loss of time. To remedy this serious drawback, blind equalization techniques have been proposed. Blind equalization techniques are capable of converging in a configuration of limited distortion without the necessity of using a predetermined reference symbol sequence (see Y. Sato, "A method of self-recovering equalization for multilevel amplitude-modulation systems", IEEE Transaction on Communication, Vol. COM-23, N. 6, pp. 679-682, June 1975; D. N. Godard, "Self-recovering equalization and carrier tracking in two-dimensional data communication systems", IEEE Transaction on Communication, Vol. COM-28, N. 11, pp. 1867-1875, November 1980; A. Benveniste and M. Goursat, "Blind equalizers", IEEE Transaction on Communication, Vol. COM-32, N. 8, pp. 871-883, August 1984).

To minimize inter-symbol interference these blind techniques typically use new non-convex cost functions different than the mean square error used for the self-learning equalizer. Under weak conditions, these cost functions characterize the inter-symbol interference sufficiently well while their stochastic minimization can be performed by using locally generated control signals with no knowledge of the transmitted data. However, these methods of adaptive blind equalization are not fully satisfactory because they do not converge smoothly, and particularly because under steady state operating conditions they maintain a very high residual variance of the error signal. In other words, they do not reach the point of minimal inter-symbol interference but oscillate continually around the minimum. This leads to operation with unacceptable results.

Blind equalization techniques are attractive not only because they provide for uninterrupted data transmission (because there is no need to send a training sequence when incorrect decisions are made or the transmission channel characteristics change) but, also because they are quite easy to implement in practice. Most of the existing blind equalization techniques can be categorized as decision-directed-type techniques which use a nonlinear estimator at the output of the equalizer to generate a decision-directed estimated error. This error is then utilized to adjust the coefficients in a feed forward filter. Thus, the decision directed type equalizer uses a feed forward filter to compensate for the non-ideal channel. However, a feed forward filter is not very effective in equalizing channels containing spectral nulls. In an attempt to compensate for the channel distortion, the equalizer places a large gain in the vicinity of the spectral null and as a consequence significantly enhances the additive noise present in the received signal. Consequently, decision directed blind equalizers are not effective for equalizing channels containing spectral nulls. Spectral nulls in the transmission channel are encountered in practice wherever there is multipath propagation. Mobil radio channels, as discussed above, are generally characterized as fading multipath channels with time dispersion (multipath spreads). The ability of the equalizer to compensate for spectral nulls is particularly important where multi-path propagation is present.

Additionally, a decision directed equalizer does not efficiently compensate for postcursor ISI. Postcursor ISI is the effect of previously detected symbols on the present symbol. Because detected symbols are not used as feedback, the effect of ISI from previously detected symbols is not effectively removed from the present estimate. The decision directed equalization with a feedforward filter attempts to invert the transmission channel without directly using previously detected symbols.

Decision feedback equalization techniques use feedback to provide for better compensation for spectral nulls and attempt to eliminate postcursor ISI. Decision feedback equalization permits the removal of ISI by using decision feedback to cancel from the present symbol the interference from symbols which have already been detected. The basic idea of decision feedback equalization is that if the value of symbols already detected are known then the ISI contributed by these symbols in the present symbol can be determined and canceled exactly by subtracting the previously detected symbol values with appropriate weighing. A typical decision feedback equalizer combines the output of a feed forward filter and feedback filter, and provides the combined outputs to a decision element. The output of the decision element is then utilized by the feedback filter. The output of a feedback filter can be thought of as representing the postcursor ISI imposed by previously detected symbols on the present symbol.

The adjustment of the feed forward filter and feedback filter are typically based on the current value of the filter coefficients and an objective function. The objective function typically uses an error signal which can be defined as the difference between the symbol sequence input to the decision element and the output symbol sequence of the decision element. Because the error signal is based upon the output sequence and the output sequence is used as input to the feedback filter, decision feedback equalizers are susceptible to decision error propagation. Decision error propagation can cause the equalizer to "blow up", diverge or oscillate.

The problem of decision error propagation can be explained as follows, if the decision element incorrectly decides (or detects or assigns) a symbol this incorrect symbol is provided to the feedback filter as input. It should be noted that this incorrect decision will then be utilized by the feedback filter to compensate for postcursor ISI for a number of present symbols (the exact number will depend upon the number of delay elements in the feedback filter). The incorrect determination by the decision element not only impacts the symbols provided to and propagated in the feedback filter but, also impacts the error signal which is utilized by the feedback filter to adjust its coefficients. The incorrect adjustment of the coefficients along with the incorrect symbols used by the feedback filter causes an incorrect cancellation to be made from the present symbol (i.e., the postcursor ISI from previously detected symbols is incorrectly determined). The sequence provided to the decision element is thus incorrect and the decision element is more likely to make another incorrect decision. This cycle repeats. In severe cases decision error propagation can cause the equalizer to diverge rather than converge. Thus, the decision error propagates through the equalizer resulting in the equalizer not minimizing the ISI.

One proposed solution to reduce the effects of decision error propagation is to provide a reliability criterion for the serf-decided symbols that prevents updating of the adjustable coefficients when the reliability criterion is low. (See U.S. Pat. No. 4,847,797 entitled Adaptive Blind Equalization Method and Device, to Picchi et. al.) Thus a binary consent function prevents the equalizer from updating the adaptive coefficients. This technique requires the additional complexity of a consent or inhibit function. It also prevents the equalizer from tracking changes in the transmission channel when the reliability criterion is low. The propagation error still exists but, the binary consent function allows adaptation to proceed when the propagation error is small and stops adaptation when the propagation error is large. Thus, this technique only stops adaptation and not the propagation error.

SUMMARY OF THE INVENTION

The object of the invention is to overcome the above mentioned drawbacks.

It is an object of the invention to equalize received signals without the need to provide training sequences.

It is an object of the invention to provide for equalization for fading multipath channels with time dispersion.

It is still a further object to provide equalization for channels with spectral nulls without significantly enhancing the noise.

It is an object of the invention to minimize the effect of inter-symbol interference.

It is yet another object to reduce or eliminate the effects of decision error propagation.

It is an object of the invention to provide for equalization for fading multipath channels with time and frequency dispersion.

Accordingly, the present invention provides a device and method for the equalization of received signals or received symbol sequences. An equalization device for the equalization of electrical signals codified into symbols and transmitted on a transmission channel has a first feed forward filter with a received symbol sequence as input, the first feed forward filter having a series of delay means for delaying said received symbol sequence to provide one or more delayed symbol sequences, a means for multiplying each of the symbol sequences by an adjustable coefficient associated with the symbol sequence, a summation means for adding the multiplied symbol sequences to obtain signal samples; a first decision means for assigning a decided symbol to each signal sample from said first feed forward filter using a first decision process; a second feed forward filter with the received symbol sequence as input, the second feed forward filter having a series of delay means for delaying said received symbol sequence to provide one or more delayed symbol sequences, a means for multiplying each of the symbol sequences by an adjustable coefficient associated with the symbol sequence; a feedback filter with decided symbols from the first decision means as input, the feedback filter having a series of delay means for delaying said input symbols to provide one or more delayed symbol sequences, a means for multiplying each of the delayed symbol sequences by an adjustable coefficient associated with the delayed symbol sequence; a combiner for combining the multiplied symbol sequences from the second feed forward filter with the multiplied symbol sequences of the feedback filter to provide combined signal samples; a second decision means having the combined signal samples as input, the second decision means for assigning a decided symbol to each input signal sample using a second decision process, providing said decided symbol as the output of the equalizer apparatus; a first coefficient adjustment means for adjusting the coefficients of the first feed forward filter using a first coefficient adaptation process and a first objective function; a second coefficient adjustment means for adjusting the coefficients of the second feed forward filter using a second coefficient adaptation process and a second objective function; and a third coefficient adjustment means for adjusting the coefficients of the feedback filter using a third coefficient adaptation process and a third objective function.

An equalization method for the equalization of electrical signals codified into symbols and transmitted on a transmission channel having the steps of filtering a received symbol sequence with a first feed forward filter having adjustable coefficients; assigning one or more symbols to said filtered symbol sequence by a first decision element; filtering said received symbol sequence with a second feed forward filter having adjustable coefficients; filtering said assigned symbols from said first decision element by a feedback filter having adjustable coefficients;, combining said filtered symbol sequence from said second feed forward filter with the filtered symbol sequence from said feedback filter; assigning one or more symbols to said combined symbol sequence by a second decision element and outputting said assigned symbols from said second decision element as the equalized symbol sequence; and updating the adjustable coefficients associated with the First feed forward filter, the Second feed forward filter and the feedback filter.

The present invention is an adaptive equalization method and device which provides for the equalization of symbol sequences sent through fading multipath channels with time dispersion. By using a trainer system to supply an estimate of the received symbol sequence to a trainee system equalization of the received symbol sequences is accomplished without the need for training sequences and with the ability of compensating for spectral nulls without substantial increasing the noise in the system. The trainer system is configured as a decision directed equalizer with a feed forward filter having the received symbol sequence as input and connected to a decision element that outputs decided symbols. The trainee system is similar to decision feed back equalization in that it has a feed forward filter, a feedback filter and a decision element but, differs in that the input to the feed back filter is provided by the trainer system. The feed forward filter of the trainee system takes received symbol sequence as input. The output of the feed forward filter and the feedback filter of the trainee system is provided to the decision element which outputs the equalized symbols sequences.

BRIEF DESCRIPTION OF THE DRAWINGS

The foregoing and other objects, aspects and advantages of the invention will be better understood from the following detailed description with reference to the drawings, in which.

DETAILED DESCRIPTION OF THE PREFERRED EMBODIMENT

I. OVERVIEW

Figure 7:
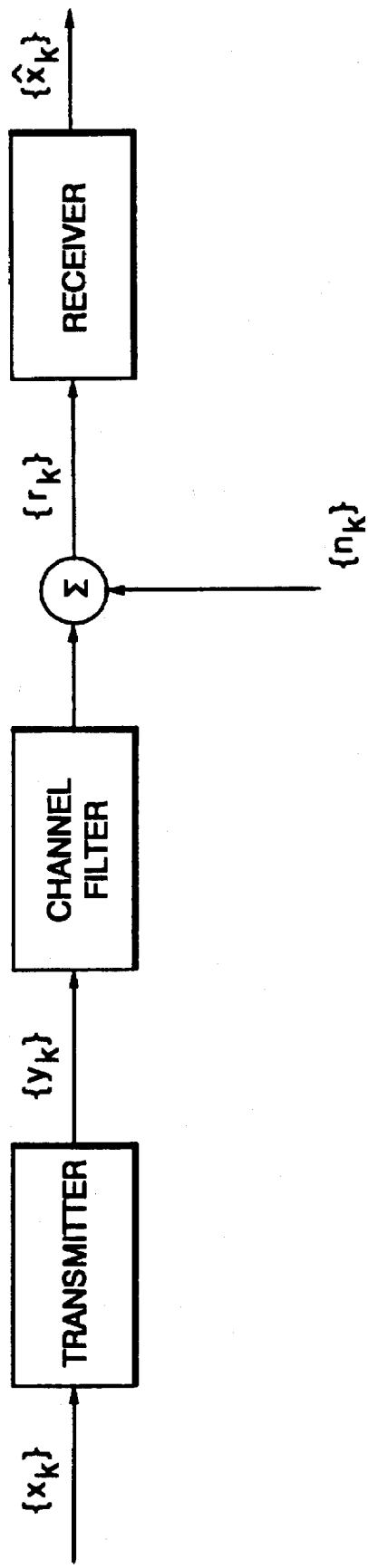
FIG. 7 shows a discrete-time equivalent communication model.

Inherent in every communication system are channels which link a transmitter and a receiver. These channels include telephone lines used in voice and modem applications, coaxial cables, fiber cables, under water channels used in acoustic applications, read/write channels used in magnetic storage devices, and atmospheric or space channels used in radar, satellite, radio, and other wireless communication systems. Although their physical media and propagation characteristics vary greatly, these channels are an important consideration in any communication system. A communication system consists of a transmitter for sending symbols into a channel and a receiver for receiving the transmitted symbols from the channel. This can be modeled as shown in FIG. 7. The equalization method and device of the present invention can be considered as part of the receiver and offers advantages to all communications systems.

Figure 4:
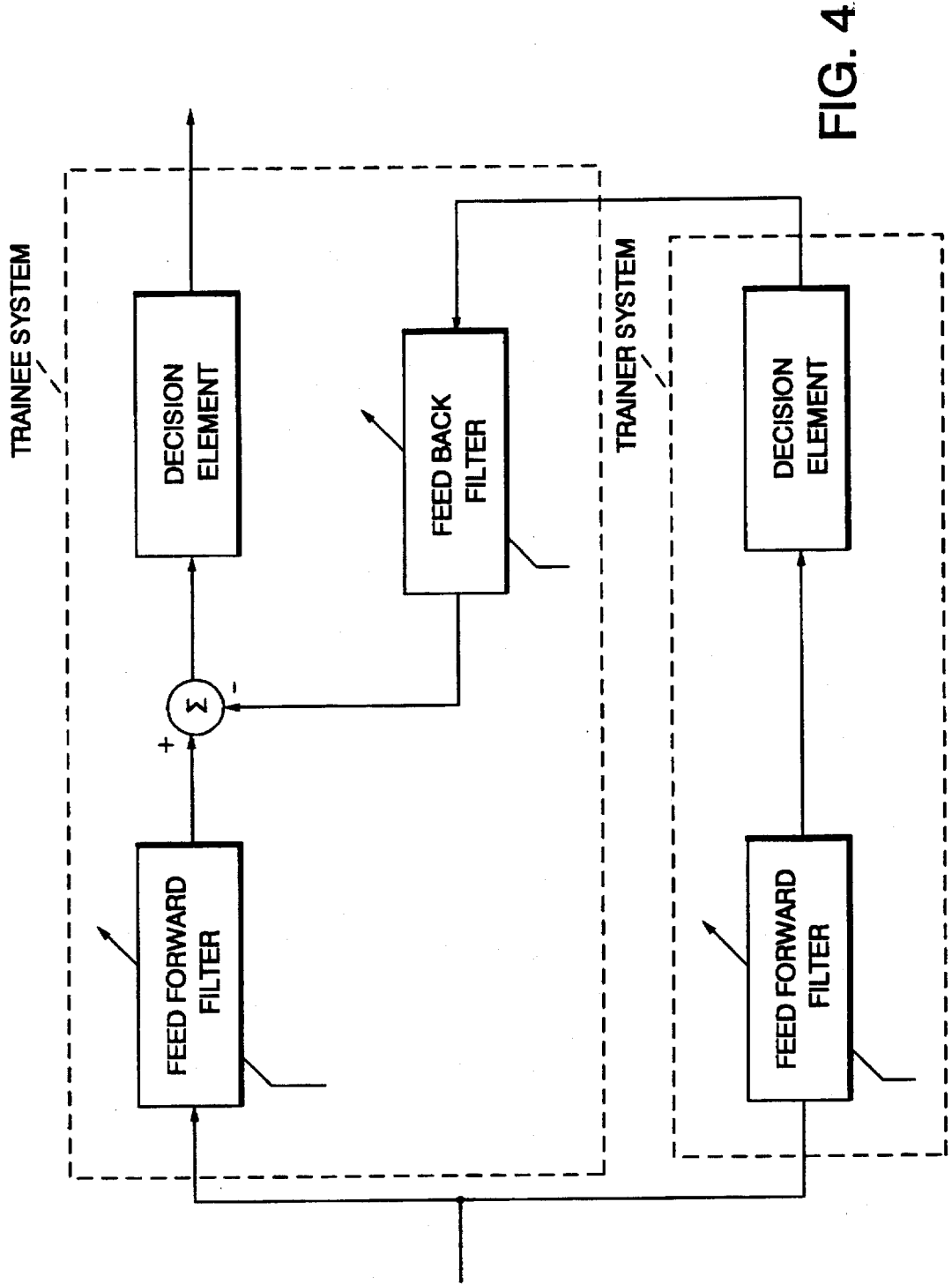
FIG. 4 shows one embodiment of the present invention.
Figure 5:
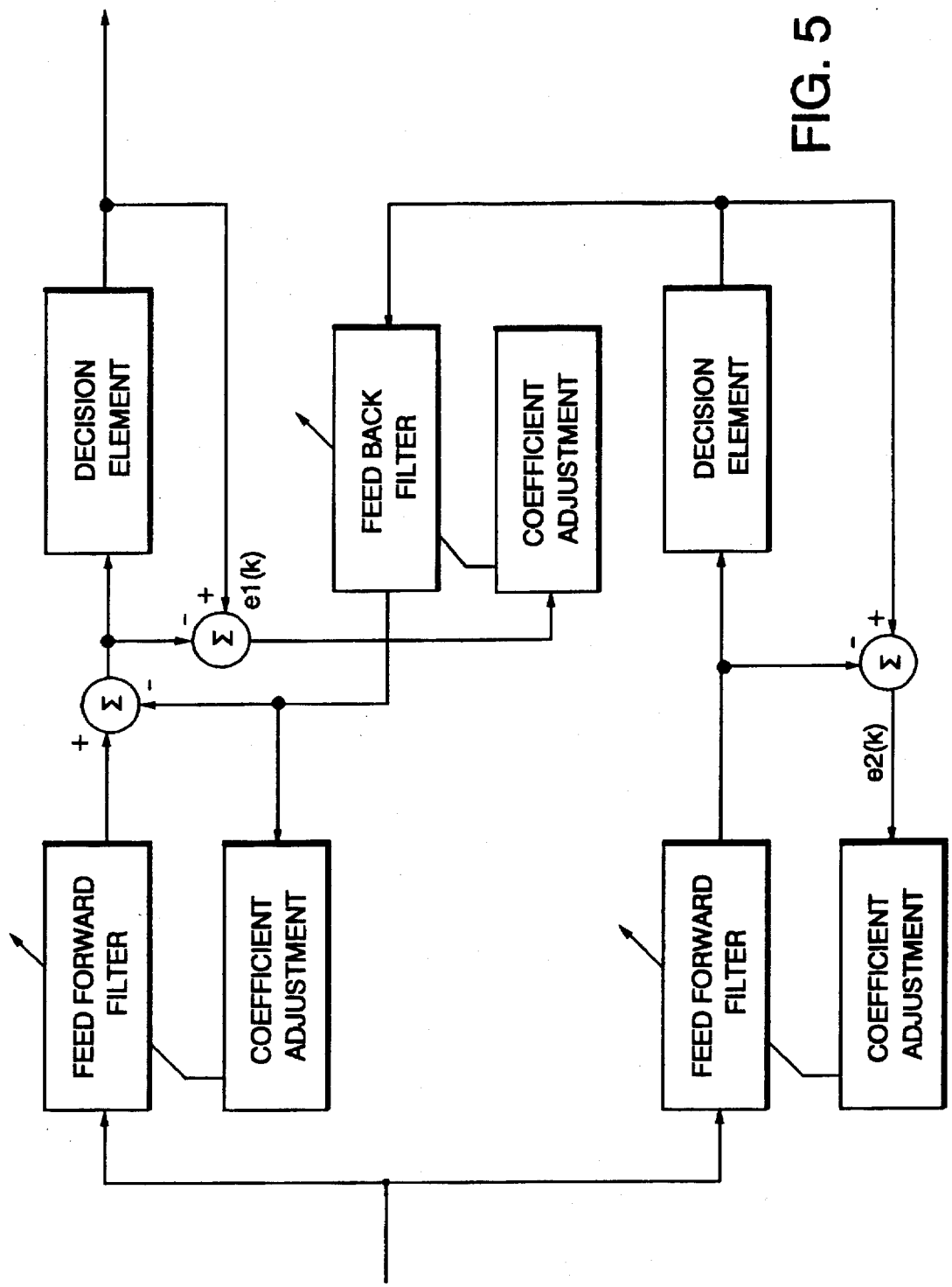
FIG. 5 shows one embodiment of the present invention highlighting the error signals.

FIG. 4 provides an overview of the present invention. The present invention as depicted in FIG. 4 can be thought of as two systems: a trainer system and a trainee system. As is shown in FIG. 4 both the trainer and trainee system receive their input signals from the same source. The input signal is electrically coded symbols from antennae or the front end of a receiver. The input signals can be thought of as electrical signals which are codified into symbols. As is shown, the trainer system consists of a decision directed equalizer having a feed forward filter and a decision element. The output signal of the trainer system is provided as input to the feedback filter of the trainee system. The trainee system looks similar to a decision feedback equalizer having a feed forward filter and feedback filter with the important exception that the input signals for the feedback filter are provided from the output of the trainer system instead of the output of the decision element of the trainee system. The output of the decision element in the trainee system, which is the output of the present invention (i.e., the equalized symbol sequence), is not directly utilized by the trainee system. The output of the decision element of the trainee system may be utilized in determining one or more of the objective functions which are used to adapt the coefficients of the adaptive filters. This feature of the present invention eliminates decision error propagation.

Each of the elements of the present invention is described in section II below. A description of a decision feedback equalizer is also provided because it provides a basis for understanding the present invention and its advantageous features. A detailed description of one embodiment of the invention is provided in section III. One example of the expected performance of the present invention is provided in section V. A discussion of the advantages of the present invention is provided in section VI.

II. ELEMENTS

A. ADAPTIVE FILTERS

The adaptive filter is typically a finite duration impulse response filter with adjustable coefficients. Adjustments of the adjustable coefficients is usually performed adaptively during the transmission of information by using an objective function and a coefficient adjustment process. This objective function is usually minimized or optimized by the coefficient adjustment process. The coefficient adjustment process or adaptation algorithm adjusts the adjustable coefficients of the adaptive filter to effect the objective function. In many systems, the objective function is an error signal and the coefficient adjustment process attempts to minimize the error signal. An error signal may use the difference between the signal input to the decision element and the signal output by the decision element. Several coefficient adaptation processes/adaptation algorithms are identified below.

Figure 1A:
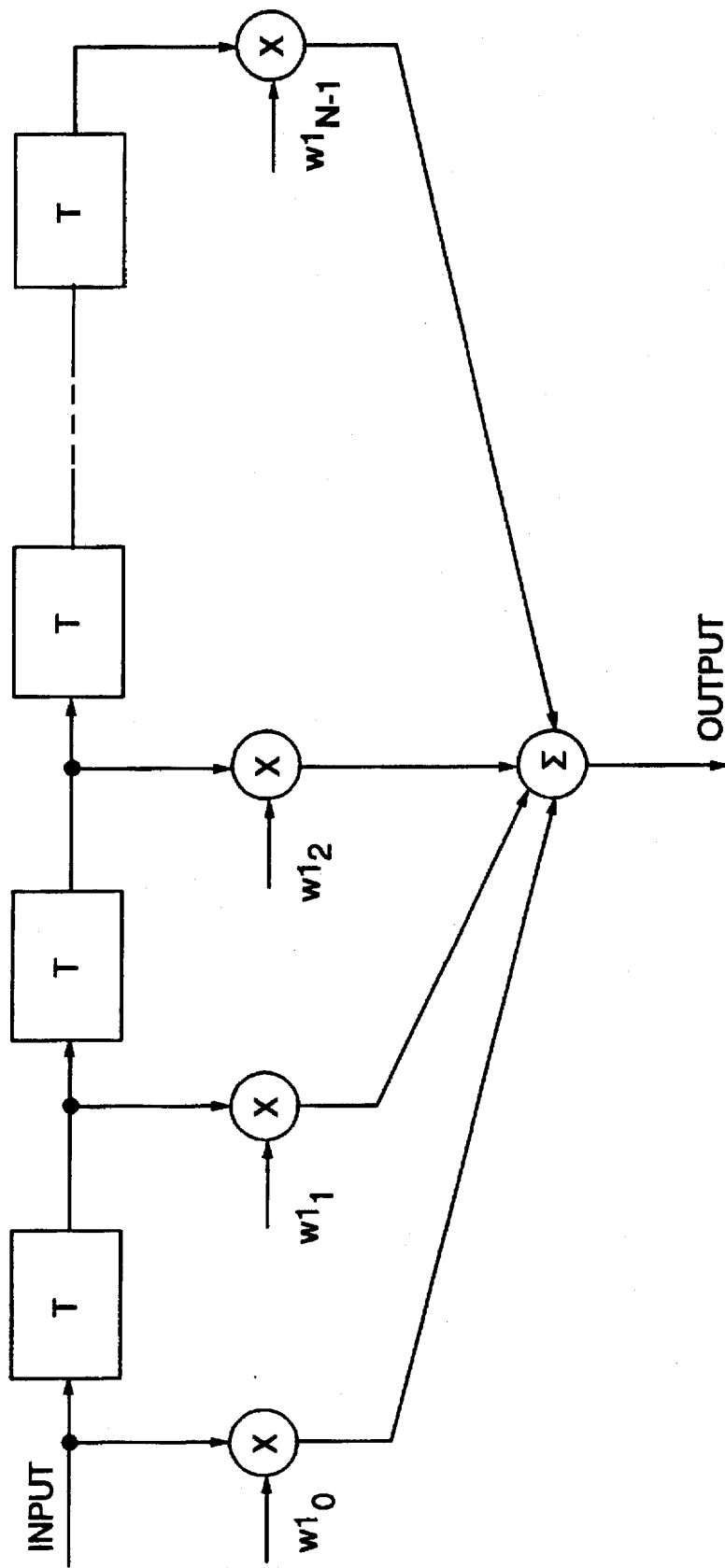
FIG. 1(a) depicts a typical feed forward transversal filter.

FIG. 1(a) shows one embodiment for a feed forward filter (FFF) where the input is a received symbol sequence which is sent through a series of delay elements. The received input sequence and each of the delayed input sequences are provided to their own variable gain amplifiers (tap gain). The variable tap gains are usually referred to as adjustable coefficients. The received input sequence and each of the delayed input sequences are multiplied by their respective adjustable coefficients. The outputs of the variable tap gain amps are then added to provide a signal sample which gives an indication of the transmitted symbol. The signal sample output of the FFF can be thought of as the estimate of the transmitted symbol with a certain delay. The signal sample output of the FFF is referred to as the present symbol or current symbol. The addition may be carried out by a summer, combiner or adder. This signal sample can then be sent to a decision element or symbol detector to obtain a decided symbol. As will be described, the present invention utilizes two FFFs one in the trainer system and one in the trainee system.

Figure 1B:
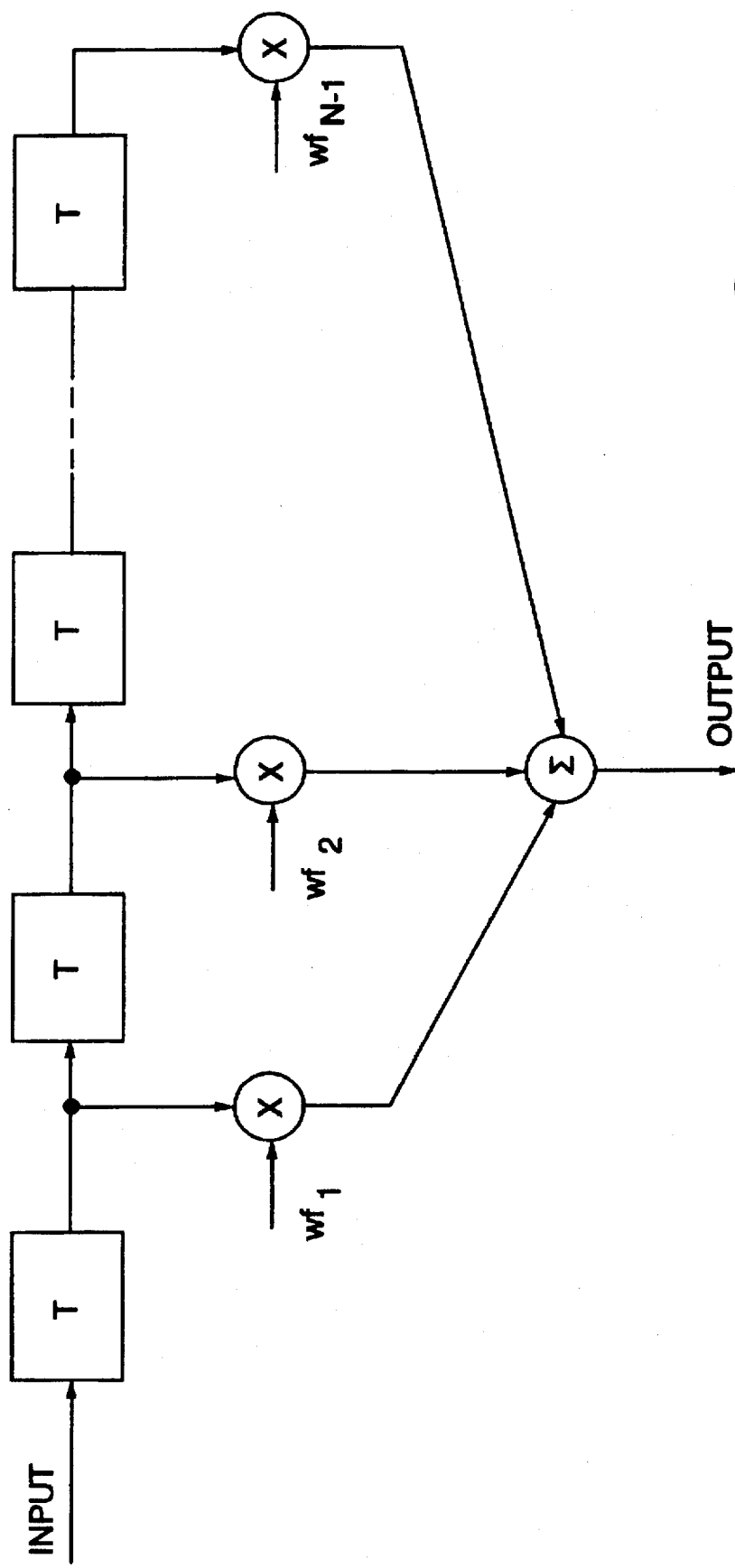
FIG. 1(b) depicts a typical feed back transversal filter.

FIG 1(b) shows one embodiment for a feedback filter (FBF) where the input is a symbol sequence which is sent through a series of delay elements. The delayed sequences are each provided with their own variable gain amplifiers (tap gain). The variable tap gains are usually referred to as adjustable coefficients. Each of the delayed input sequences are multiplied by their respective adjustable coefficients. The output of a FBF can be thought of as representing the estimated postcursor ISI due to previously assigned symbols. By canceling the ISI from the signal sample provided by the FFF the respective ISI is removed. The outputs of the variable tap gain amps of the FBF are then added with the output from a FFF to provide a signal sample which gives an indication of the transmitted symbol with the ISI cancelled. The feedback filter may use the same summer or combiner or adder as the FFF or a separate summer or combiner or adder. The signal sample with the ISI removed can then be sent to a decision element or symbol detector to obtain a assigned or decided symbol. The present invention utilizes a single FBF in the trainee system.

FFF and FBF are very similar in design and structure. The main difference between the two types of adaptive filters is where they are placed in the equalizer and the fact that the feed back filter typically delays all the signal sequences while the feed forward filter provides a coefficient for the input symbol sequence without any delay. The filters can have any number of tap gains and delay elements. The exact number of delay elements and associated tap gain amplifiers to use is a design decision dependent on one or more of the following factors: the modulation scheme, expected number of multipath signals, expected strength of multipath signals, the time dispersion, the frequency dispersion, ambient noise and data rate.

B. DECISION DIRECT EQUALIZATION (DDE)

Figure 2:
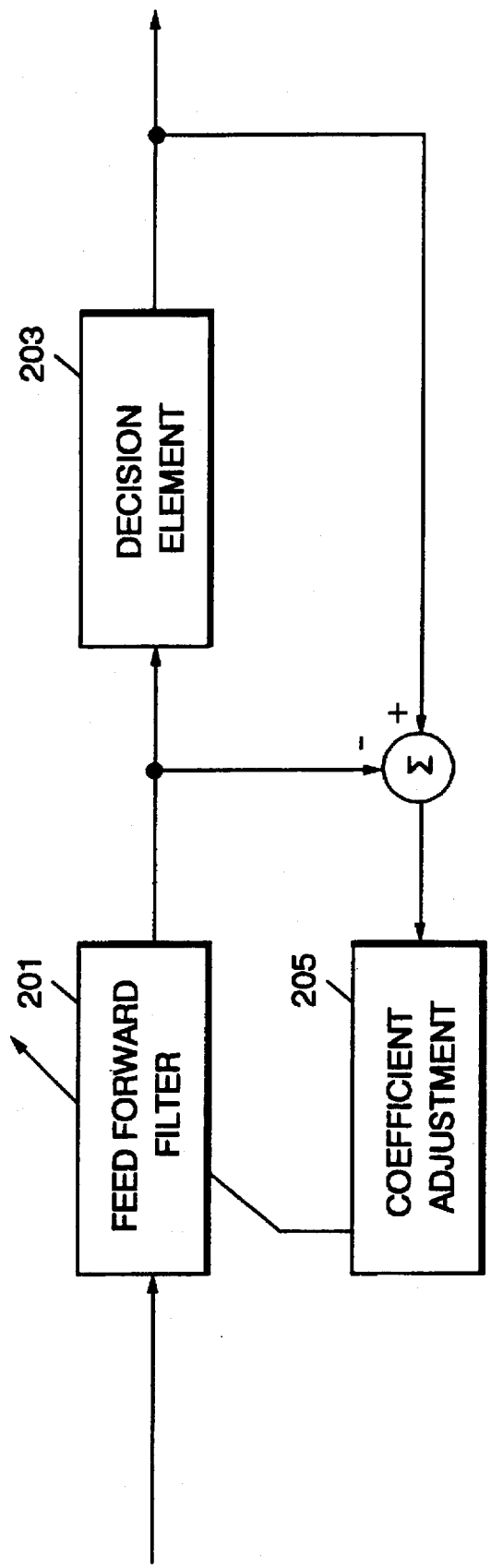
FIG. 2 depicts decision direct equalization.

FIG. 2 shows an overview of the decision direct equalization (linear equalization) using an adaptive filter. The basic idea of the DDE consists of minimizing or optimizing an objective function based upon the decision element. The objective function typically uses an error signal. The error signal can be the difference between the symbol sequence input to the decision element and the symbol sequence assigned or generated by the decision element, as is shown in FIG. 2. A typical objective function is the mean square error (MSE) which is the expected value of the square of the error signal. An input sequence is provided to the feed forward filter 201, such as is shown in FIG. 1(a), where it is passed through a series of delay elements. The input symbol sequence and the delayed symbol sequences are each multiplied by a coefficient associated with each of the tap gain amplifiers which perform the multiplication. The multiplied symbols are then added or combined or summed in a adding or summing or combining element in the FFF 201.

The combined symbol sequence is then provided to a decision element 203. The decision element 203 can use a decision process to determine which symbol the combined symbol is to be assigned from the symbol set. The assigned symbol (or decided symbol) is then provided as the equalized output of the DDE.

A coefficient adjustment element 205 is used to update the coefficients of the FFF 201. The coefficient adjustment element 205 uses a coefficient adjustment process to update the coefficients based on the current value of the coefficients, the input symbol sequence and an error signal (if an error signal is used by the objective function) or the gradient of the objective function. The coefficient adjustment element determines and updates the coefficients.

Notice that with DDE there is no feed back of the output of the decision element. This is contrasted with decision feedback equalization (non-linear equalization) shown in FIG. 3 and discussed below. As a linear system the DDE basically attempts to invert the channel. As such for spectral nulls the DDE will place a large gain in the vicinity of a spectral null. This will in turn increase the noise in the sequence at the output of the FFF 201. Thus, the DDE suffers from the drawback in that it cannot provide for good compensation for spectral nulls.

Additionally, DDE does not efficiently compensate for postcursor ISI. This is primarily because assigned symbols are not directly used as feedback, thus the effect of ISI from previously assigned symbols is not effectively removed from the present estimate. DDE attempts to invert the transmission channel without directly using previously detected symbols.

C. DECISION FEEDBACK EQUALIZATION (DFE)

Figure 3:
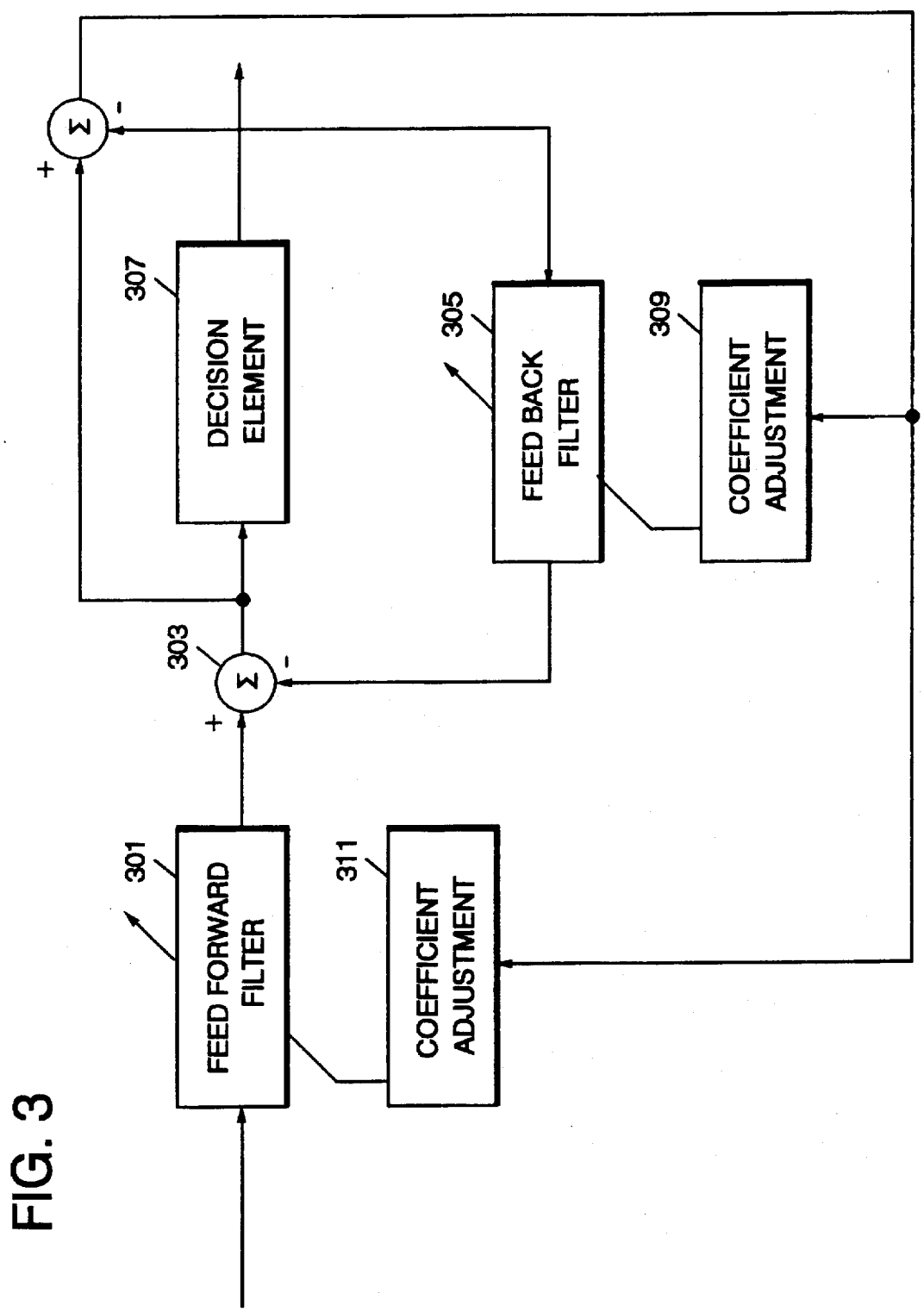
FIG. 3 depicts decision feedback equalization

DFE permits the removal of postcursor ISI by using feedback. DFE attempts to cancel the interference from symbols which have already been assigned (or detected) from the present symbol. The basic idea of the DFE is that if the value of symbols already assigned are known then the ISI contributed by these symbols can be determined and canceled exactly by subtracting past symbol values with appropriate weighing from the present symbol. FIG. 3 shows one embodiment of a DFE. DFE (also referred to as non-linear equalization) uses a feed forward filter and a feed back filter. The input sequence is provided to the FFF, as is shown in FIG. 3, where it is passed through a series of delay elements. The input symbol sequence and the delayed symbol sequences are each multiplied by a coefficient associated with each of the tap gain amplifiers which perform the multiplication. The multiplied symbols are then added or combined or summed in an adding or summing or combining element. This element may also combine multiplied symbols obtained from the FBF 305. Note that this element 303 is shown as separate for the FFF and FBF in FIG. 3, but it may be made part of the FFF 301 or the FBF 305 (as depicted in FIG 1(a) and FIG 1(b) respectively) and/or used for both. As shown in FIG. 3, the combining element 303 combines the sequence from the FFF 301 and subtracts the sequence provided from the FBF 305. The combined symbol sequence is then provided to a decision element 307.

The output of a FBF 305 can be thought of as representing the postcursor ISI imposed by previous symbols on the present received symbol. Note that the input symbol sequence to the FBF 305 is the output sequence from the decision element 307 (i.e., previously assigned or detected symbols). The FBF 305 weighs the sequence of assigned symbols to estimate the ISI in the received sequence from previously assigned symbols. In the FBF 305 the previously assigned symbols are passed through a series of delay elements. The delayed assigned symbols are then each multiplied by a coefficient associated with each of the tap gain amplifiers which perform the multiplication. The multiplied symbols from the FBF 305 are then added or combined or summed in a summing element 303 where they can be combined with the multiplied symbol sequences from the FFF 301. Note that the FBF 305 can determine the cancellation sequence or the estimated ISI (i.e., the output of the FBF 305 can be added or subtracted form the output of the FFF 301). If the FBF 305 determines the cancellation sequence then the output of the FBF 305 is added to the output of the FFF 301, if an estimate of the ISI is provided then the output of the FBF 305 is subtracted from the output of the FFF 301. Either addition or subtraction can be used, the FBF coefficients will converge to the correct sign accordingly. By compensating the received signal sequence with the output sequence of the FBF 305, the ISI is removed and the decision element 307 can use a sequence with little or no ISI.

As was stated, the combined signals from the FFF 301 and the FBF 305 are then provided to a decision element 307. The decision element 307 determines, according to a decision process, which symbol of the symbol set the combined symbol should be assigned. The assigned symbol is then provided as the equalized symbol output of the DFE. The assigned symbol is also provided as input to the FBF 305 as described above for use in processing subsequent symbols.

A coefficient adjustment elements 311 and 309 are used to update the coefficients in the FFF 301 and FBF 305, respectively. Each coefficient adjustment element uses a coefficient adjustment process to determine coefficients or updates to the coefficients. As with the DDE, the coefficient updates may be based on the current value of the coefficients, the input symbol sequence and an error signal (if an error signal is used by the objective function) or the gradient of the objective function. The coefficient adjustment element determines and updates the coefficients. The same or different objective functions may be used for both the FBF 305 and the FFF 301.

The coefficients for each filter are then updated according to the coefficient adjustment process. The coefficient adjustment process is typically the same for both the FFF and FBF but may differ. Note that in this embodiment although the coefficient adjustment process is the same the number of coefficients (i.e., the number of tap gain amplifiers) will typically be different and the coefficient values themselves will also be different. Various different coefficient adjustment processes are identified below.

A drawback of DFE is that it is susceptible to decision error propagation, particularly when multipath propagation is present in the communication channel. Decision error propagation stems from the DFE assuming that the decision element has correctly assigned previous symbols. When an incorrect decision or assignment is made by the decision element the incorrectly assigned symbol is provided to the FBF. The FBF uses the incorrectly assigned symbol in computing the postcursor ISI in the present symbol. The FBF uses the incorrectly assigned symbol in determining the postcursor ISI for subsequently received symbols until the incorrectly assigned symbol has propagated through all the delay elements of the FBF. Thus, the next few received symbols are effected as the incorrectly assigned symbol propagates through the delay elements of the FBF. The use of the incorrectly assigned symbol in turn may create subsequent incorrect decisions because the output of the FFF is compensated for using incorrect estimate of the postcursor ISI. This problem is further compounded because the error signal, used by the objective function and the coefficient adjustment process to update the FBF coefficients, is also based upon the incorrectly assigned symbols. The incorrect adjustment of the coefficients along with the incorrect symbols used by the feedback filter cause an incorrect cancellation to be made from the present symbol (i.e., the postcursor ISI from previously assigned symbol is incorrectly determined). The sequence provided to the decision element is thus incorrect and the decision element is more likely to make another incorrect assignment which is provided to the FBF so that the FBF is now using two incorrectly assigned symbols. The cycle repeats and performance of the equalizer worsens as the decision error propagates through the equalizer resulting in the equalizer not minimizing the ISI.

D. COEFFICIENT ADJUSTMENT PROCESS/ADAPTATION ALGORITHM

The coefficient adjustment process determines what adjustments are needed in the coefficients of an adaptive filter. Many adaptation techniques have been developed. Some of these are identified below. Some adaptation algorithms require that a known sequence of symbols be sent by the transmitter in order to initially adjust the weights. Equalization schemes that do not require an initial known sequence of symbols or reference sequence are referred to as blind equalization schemes. All coefficient adjustment processes make use of an objective function. A typical objective function is the Mean Square Error (MSE) which uses the expected value of the square of an error signal. The coefficient adjustment process attempts to modify the coefficients of the adaptive filter such that the measure of the objective function is minimized or optimized. The coefficient adjustment process attempts to change the coefficients so as to move closer to the minimum or optimum point on the objective function surface. In order to update the coefficients the coefficient adjustment process typically determines and utilizes the gradient of the objective function with respect to the coefficients. The following is a list of several adaptation schemes that can be used for updating filter coefficients:

1. Least Mean Square (LMS)-
    a. Widrow & Hoff
2. Recursive Least Squares (RLS)
    a. Square Root RLS
    b. Fast RLS or Fast Transversal Equalization
3. Gradient
4. Katman
5. DFS
6. Zero-forcing algorithm.
7. Lattice implementations of LMS and RLS algorithms
8. Stochastic Optimization Methods (i.e., Annealing Techniques)

A survey of Adaptive Equalization Techniques is provided in "Adaptive Equalization for TDMA Digital Mobile Radio" by John G. Proakis, IEEE Transaction on Vehicular Technology, Vol. 40, No. 2, May 1991 hereby incorporated by reference. Detailed descriptions of the identified coefficient adjustment processes can also be found in "Adaptive Signal Processing" by Thomas Alexander (1986) and "Digital Communications", Second Edition 1989 by John G. Proakis, "Adaptive Filtering of Nonlinear Systems with Memory by Quantized Mean Field Annealing" IEEE Transaction on Signal Processing Vol 41 No. 2, February 1993 by R. A. Nobakht et. al., all of which are hereby incorporated by reference.

The present invention is not limited to any particular adaptation technique, algorithm or scheme. The adaptation techniques identified above are some of the more common ones. The present invention may use one or more coefficient adaptation processes in a particular embodiment of the invention. One adaptation process may be used for each adaptive filter in the present invention. The adaptive filters may use the same adaptation process as another adaptive filter or a different process. Each adaptive filter may have a different adaptive process or all filters may use the same process or two filters may use the same process. The particular adaptation process selected will depend upon the requirements of the communication system. Such factors as rate at which the transmission channel characteristics change, computational complexity of a given scheme, and the capabilities of particular hardware selected for implementation will determine which particular scheme to use.

E. DECISION ELEMENT

The decision element or detection element or assignment element, determines or detects which particular symbol in a symbol set, the outputted symbol is to be assigned. Various different decision processes can be used with the present invention. The decision element may be a simple slicer or can use a more sophisticated decision process. The slicer may use a threshold logic function or a sigmoidal function. Other functions may be utilized with the present invention as well. The following is a list of possible decision processes/algorithms:

1. Bussgang Algorithms
    a) Decision directed (Lucky)
    b) Generalized Dec. Directed(Karaoguz)
    c) Stop-and-Go (Picchi and Prati)
    d) Sato Algorithm (Sato)
    e) Generalized Sate (Benveniste et. al.)
    f) Bussgang (Bellini)
    g) Crimno (Nikias)
    h) Godard algo. (Godard)
    i) CMA algo. (Treichler)
2. Polyspectra algorithms
    a) Tricepstrum (Hatzinakos)
    b) Power Cepstrum (Besslos et al.)
    c) Cross-Tricepstrum (Brooks and Nikias)
3. Nonlinear Filter Structures
    a) Volterra Series Based
    b) Neural Network based (Gibson, Kohonen, Chen)

The above decision processes are well known in art and a detailed descriptions may be found in one or more references. In particular, Adaptive Filter Theory, Second Edition by Simon Haykin hereby incorporated by reference.

Figure 9:
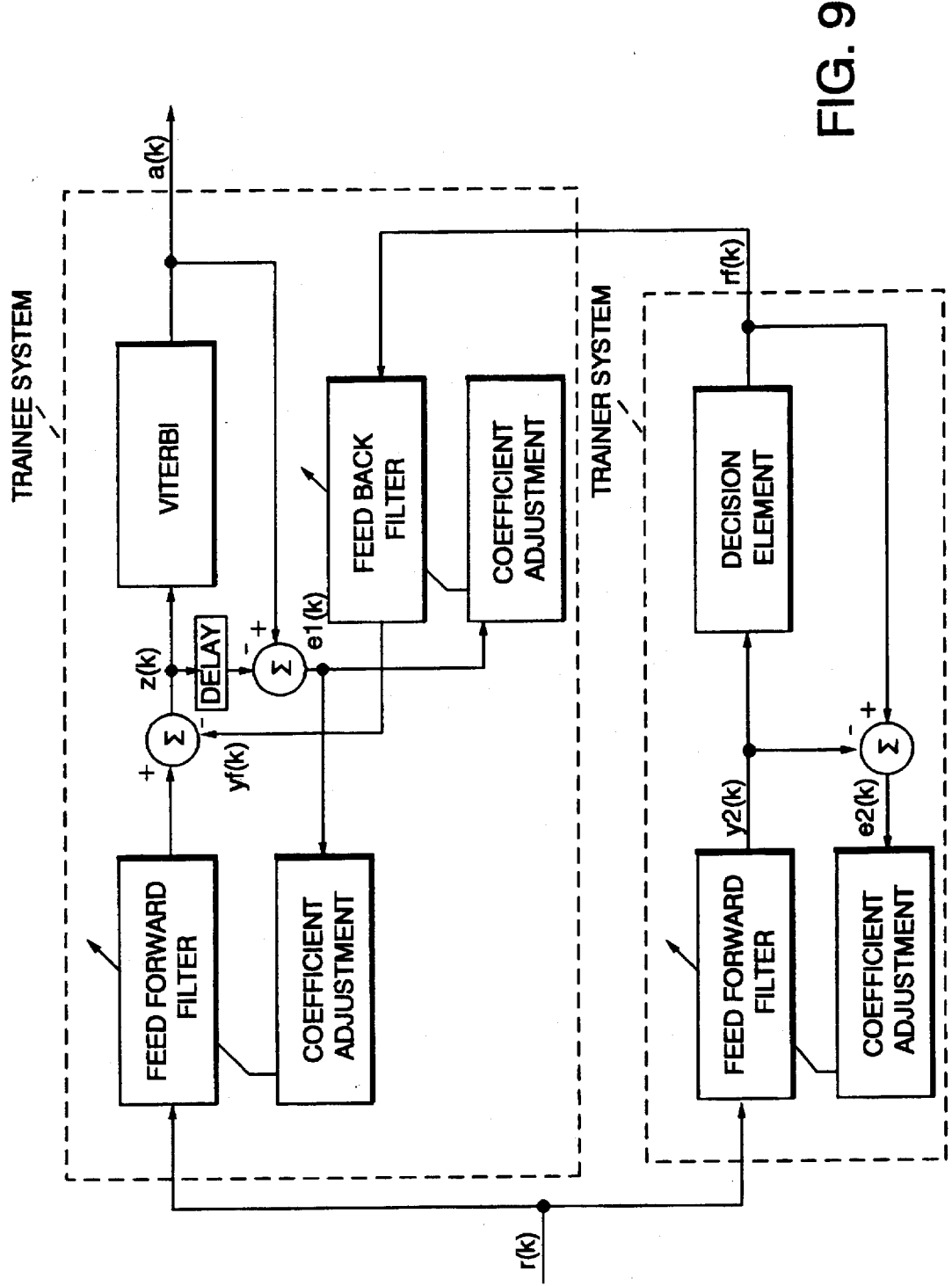
FIG. 9 shows one embodiment of the present invention using Viterbi decoding.

FIG. 9 shows one embodiment of the present invention using a Viterbi decoder in the decision element. Viterbi decoding is particularly well-suited when trellis code modulation is used in the transmitter. It should be noted that there are many ways to implement the present invention with viterbi decoding—the embodiment in FIG. 9 illustrating just one embodiment of many.

The particular decision element selected will depend upon the particular communication system parameters, desired error rate, data rate and other factors. Although the present invention applies to a blind equalization technique, i.e., it does not require transmission of a known training or reference sequence, it may be used with training sequences.

The present invention is not limited to any particular decision element or decision process. The decision processes identified above are some of the more common ones. The present invention may use one or more decision processes in a particular embodiment of the invention. The decision elements of the present invention may use the same decision process or different decision processes. The particular decision processes selected will depend upon the requirements of the communication system. Such factors as rate at which the transmission channel characteristics change, computational complexity of a given scheme, and the capabilities of particular hardware selected for implementation will determine which particular scheme to use.

III. DETAILED DESCRIPTION OF THE PREFERRED EMBODIMENT

Figure 6:
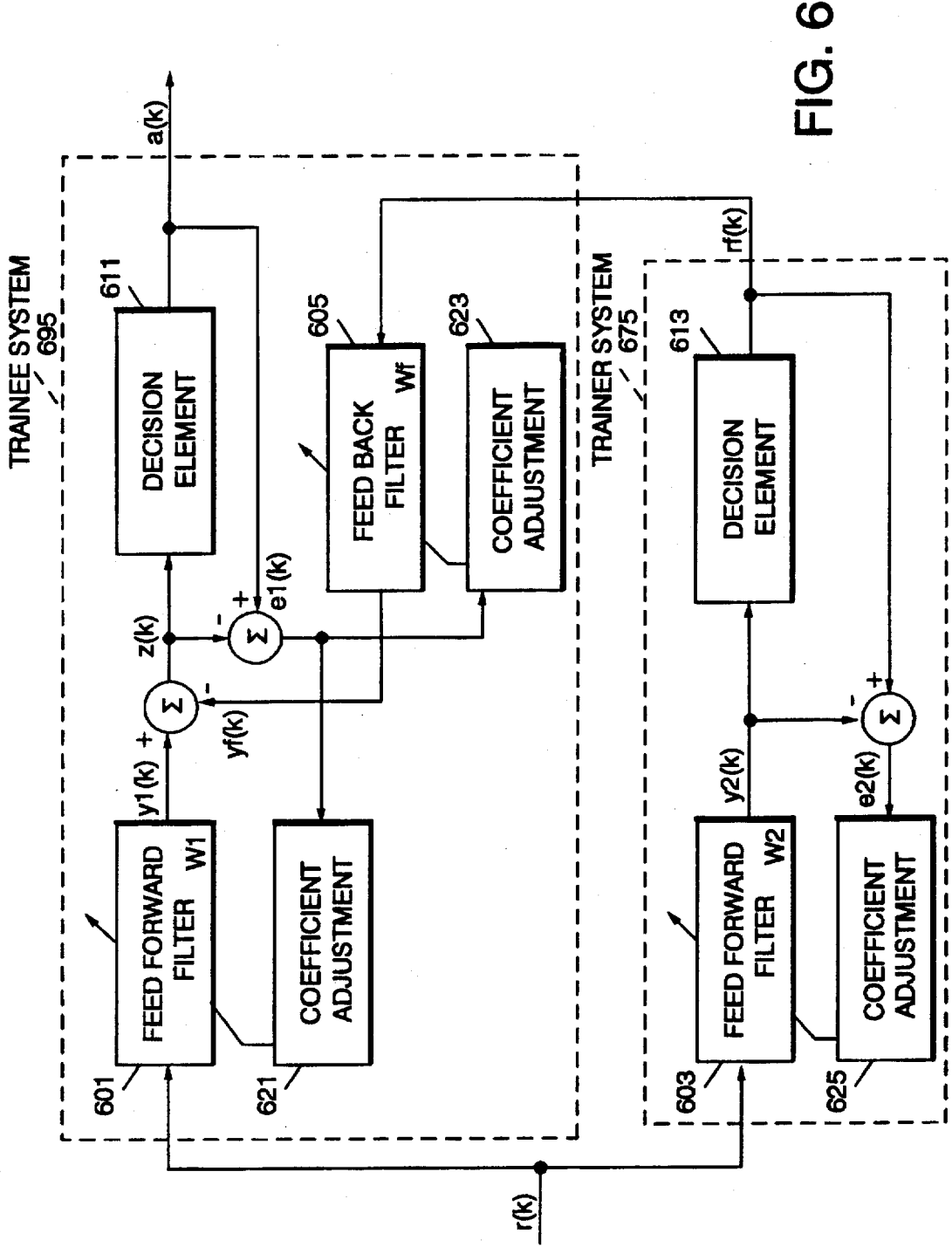
FIG. 6 shows one embodiment of the present invention highlighting the trainee and trainer system elements.

FIG. 6 shows an overview of one embodiment of the present invention. The present invention is a hybrid equalization system using a Decision Directed Equalization (DDE) section called a trainer system and a modified Decision Feedback Equalization (DFE) section called a trainee system. As is shown in FIG. 6 the output of the trainer system 675, $r_f$, is used as input to the FeedBack Filter (FBF) 605 of the trainee system 695. In a typical DFE the output of the decision element is used as input to the FBF. By combining a DFE and a DDE into a single equalizer the present invention achieves significant advantages over prior art equalization techniques.

The present invention uses two equalization systems: a trainee system and a trainer system. The trainer system is designed to continuously train the trainee system without the need for training sequences. The present invention in the embodiment depicted in FIG. 6 is composed of feed forward filters (FFFs), elements 601 and 603, and FBF 605. Each filter section can be updated using different or the same coefficient adjustment processes.

The trainer system 675 does not utilize feedback filter. The major components of the trainer system are as follows: a feed forward filter 603, a decision element 613 and a coefficient adjustment element 625. The output of the trainer system is provided to the feedback filter of the trainee system (rf(k)). The coefficient adjustment element 625 requires that an objective function be provided (e.g, MSE). The trainee system 695 consists of a modified Decision Feedback Equalizer (DFE). The major components of the Trainee system 695 are as follows: feed forward filter 601, decision element 611, a feedback filter 605 and a coefficient adjustment element 621.

In the trainer system 675, the input to the feed forward filter 603 is the received signal sequence, r(k). In the trainee system 695, the input to the feed-forward filter is also the received signal sequence r(k) and the input to the feedback filter 605 is the assigned symbols, rf(k), from the trainer system 675. The output of a FBF 605 can be thought of as representing the postcursor ISI imposed by previous symbols on the present received symbol. Note that the input symbol sequence to the FBF 605 is the output sequence, rf(k), from the decision element 613 (i.e., previously assigned or detected symbols from the trainer system 675). The FBF 605 weighs the sequence of assigned symbols to estimate the ISI in the received sequence from previously assigned symbols. In the FBF 605 the previously assigned symbols, rf(k), are passed through a series of delay elements. The delayed assigned symbols are then each multiplied by a coefficient associated with each of the tap gain amplifiers which perform the multiplication. The multiplied symbols from the FBF 605 are then combined with the multiplied symbol sequences from the FFF 601. As with DFE, the FBF 605 can determine the cancellation sequence or the estimated ISI (i.e., the output of the FBF 605 can be added or subtracted from the output of the FFF 601). Thus, either addition or subtraction can be used, and the FBF coefficients will converge to the correct sign accordingly.

For purposes of illustrating the present invention all filter sections will be assumed to be updated using a Least Mean Square (LMS) coefficient adjustment process. Using the LMS technique the filters are updated in proportion to an estimated error signal (the objective function). This error signal can be easily computed by an unsupervised algorithm.

If the complex transversal forward filter taps for the FFF 601 of the trainee system are given as follows:

$$w1 = w1_R + jw1_I = [w1_0(k) w1_1(k) \ldots w1_{N-1}(k)]^t \quad (1)$$

and the received complex input vector stored in the equalizer delay taps at sampling instant k is:

$$r = r_R + jr_I = [r(k) r(k-1) \ldots r(k-N+1)]^t \quad (2)$$

Then the real and imaginary components of the feed forward filter 601 output, $y1(k) = y1_R + jy1_I$, can be found as:

$$y1_R = r_R{}^t w1_R - r_I{}^t w1_I$$

$$y1_I = r_I{}^t w1_R - r_R{}^t w1_I \quad (3)$$

For purposes of illustrating the present invention, the decision elements (611, 613) in FIG. 6 will be assumed to contain a nonlinear estimator represented as follows:

$$g(z) = \mu \left( \frac{1 - e^{-\frac{2z}{\sigma^2}}}{1 + e^{-\frac{2z}{\sigma^2}}} \right) \quad (4)$$

Notice that for the variance value, $\sigma^2 = 0$, the nonlinearity reduces to a sign function or a "Slicer" which is equal to $\mu$ if the argument is greater than or equal to zero, and $-\mu$ if the argument is less than zero. Furthermore, the nonlinearity g(z), used by the proposed decision feed-back blind equalization algorithm provides a more reliable error signal than the sign nonlinearity used by the classical DFE algorithm when the channel distortion is large.

Based on the complex signal notations, the input to the nonlinear estimator of the decision element 611 can be defined as follows:

$$z(k) = z_R(k) + jz_I(k) = y1(k) - yf(k) \quad (5)$$

The input to the nonlinear estimator for the decision element 613 of the trainer system can be defined as follows:

$$y2(k) = y2_R(k) + jy2_I(k) \quad (6)$$

The difference between the output sequence of the decision element and the input sequence to the decision element is commonly referred to as an error signal. The error signal is commonly used by an objective function. In FIG. 6 the error signal for the trainee system can be given as follows:

$$e1(k) = g(z(k)) - z(k) = e1_R(k) + je1_I(k), \text{ where}$$

$$e1_R(k) = g(z_R(k)) - z_R(k) \quad e1_I(k) = g(z_I(k)) - z_I(k) \quad (7)$$

and for the trainer system the error signal may be given as follows:

$$e2(k) = g(y2(k)) - y2(k) = e2_R(k) + je2_I(k), \text{ where}$$

$$e2_R(k) = g(y2_R(k)) - y2_R(k) \quad e2_I(k) = g(y2_I(k)) - y2_I(k) \quad g(y2(k)) = rf(k) \quad (8)$$

In the trainee system the same error signal, e1(k), is used in updating the feed-forward and the feedback filters. The error signal can best be distinguished by establishing an analogy with the classical Least Mean Squares (LMS) coefficient adjustment process using the MSE as the objective function. Observe that the complex LMS coefficient adjustment process has the following update rule for the three equalizer filters where w1 represents the coefficients associated with FFF 601, w2 represents the coefficients associated with FFF 603, and wf represents the coefficients associated with FBF 605. Each of the coefficients for each of the respective filters is updated as follows:

$$w1(k+1)=w1(k)+\alpha 1 e1(k) r^*(k)$$

$$w2(k+1)=w2(k)+\alpha 2 e2(k) r^*(k)$$

$$wf(k+1)=wf(k)+\alpha f\, e1(k) rf^*(k) \qquad (9)$$

where (*) denotes conjugation operation and α1, α2 and αf are suitably selected constants. Note that one constant may be used for all three filters. α is an adapation constant or adapation rate that can be thought of as the size of the steps taken down the error curve. Other variations of this method can be used with the present invention. For example the following: w(k+1)=w(k)+αe(k)r*(k)+β(w(k)−w(k−1)) which includes a momentum term, β(w(k)−w(k−1)), where β is a constant that is multiplied by the change in the weights from a previous iteriation. In terms of the real and imaginary components of the complex received input vectors, r & rf, and the error signals, e1 & e2, the update terms in equation (9) can be written as:

$$r^*e1=(r_R e1_R + r_I e1_I) + j(r_R e1_I - r_I e1_R)$$

$$r^*e2=(r_R e2_R + r_I e2_I) + j(r_R e2_I - r_I e2_R)$$

$$fr^*e1=(rf_R e1_R + rf_I e1_I) + j(rf_R e1_I - rf_I e1_R) \qquad (10)$$

Finally, all six (real and imaginary) equalizer feed-forward and feedback filter taps are adaptively adjusted according to the following update rule:

$$w1_R(k+1)=w1_R(k)+\alpha 1(r_R e1_R + r_I e1_I)$$

$$w1_I(k+1)=w1_I(k)+\alpha 1(r_R e1_I - r_I e1_R)$$

$$w2_R(k+1)=w2_R(k)+\alpha 2(r_R e2_R + r_I e2_I)$$

$$w2_I(k+1)=w2_I(k)+\alpha 2(r_R e2_I - r_1 e2_R)$$

$$wf_R(k+1)=wf_R(k)+\alpha f(rf_R e1_R + rf_I e1_I)$$

$$wf_I(k+1)=wf_I(k)+\alpha f(fr_R e1_I - rf_I e1_R) \qquad (11)$$

Note that while one embodiment of the present invention has been described with respect to a complex notation, other implementations of the present invention may separate the real and the imaginary components for performance purposes.

The present invention has been described for transmission of symbols/signals in which the sampling time and the delay introduced by each of the delay elements of the adaptive filters are equal to the symbol transmission time, however the present invention is perfectly applicable to so called fractionary equalization systems (e.g., fractionally spaced equalization) without any significant changes. In a fractionally spaced equalization only the feed forward filters w1 and w2 are implemented fractionally. The FBF, wf, is not affected.

The present invention has been described without the need for the transmitter to transmit a known symbol sequence (i.e., a reference or training sequence). However, the present invention may be used with training sequences. If training symbol sequences are used then the FBF of the trainee system is provided with the known training sequence as input. The objective function for each of the adaptive filters would then utilize the known training sequence rather than the outputs of the respective decision elements while the filters are in training mode.

Dedicated Hardware or suitable programmed Digital Signal Processor (DSP) or DSPs may be used to implement the present invention. In particular the MWAVE Signal Processor (MSP) [See the Mwave DSP 2000 series and Mwave DSP 1000 series available from IBM Corporation] may be used to implement the present invention.

IV. EXAMPLES

The performance improvement obtained by the present invention was simulated and compared with that of a feed forward only blind equalizer. A Quadrature Amplitude Modulation (QAM) communications system was used to transmit symbols from a QPSK symbol alphabet in the presence of multipath propagation and additive white Gaussian noise. The multipath transmission medium contains a line-of-sight (LOS) path and two other multipaths which were one and three symbol intervals delayed. The relative signal powers of the multipaths compared to the LOS path are 0.4 and 0.2. The feed forward section of the blind equalizer consisted of 8 taps. The feedback filter had 4 taps which was adequate to compensate for the ISI introduced by the multipaths which have a maximum of 3 symbol duration delay.

Figure 8A:
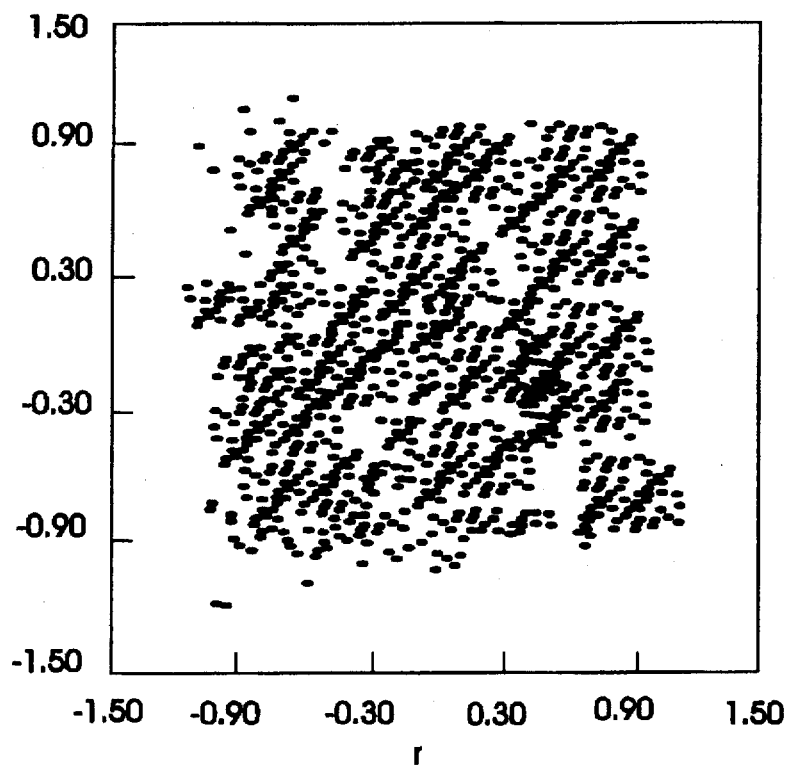
FIG. 8(a) shows the scatter diagram of the distorted received signal before equalization.
Figure 8B:
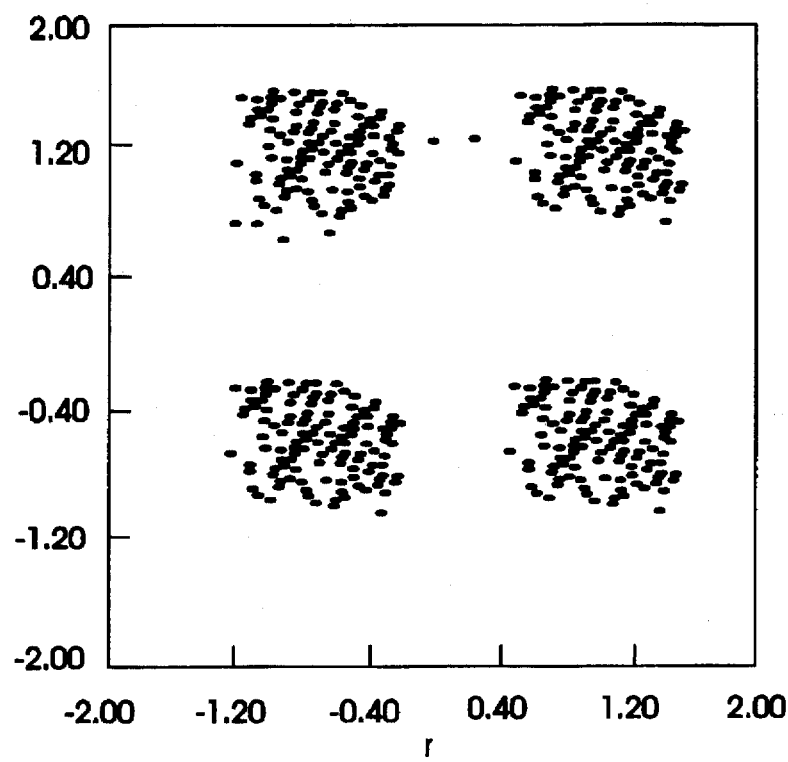
FIG. 8(b) depicts the scatter diagram of the equalized signal using the feed-forward only blind equalization.
Figure 8C:
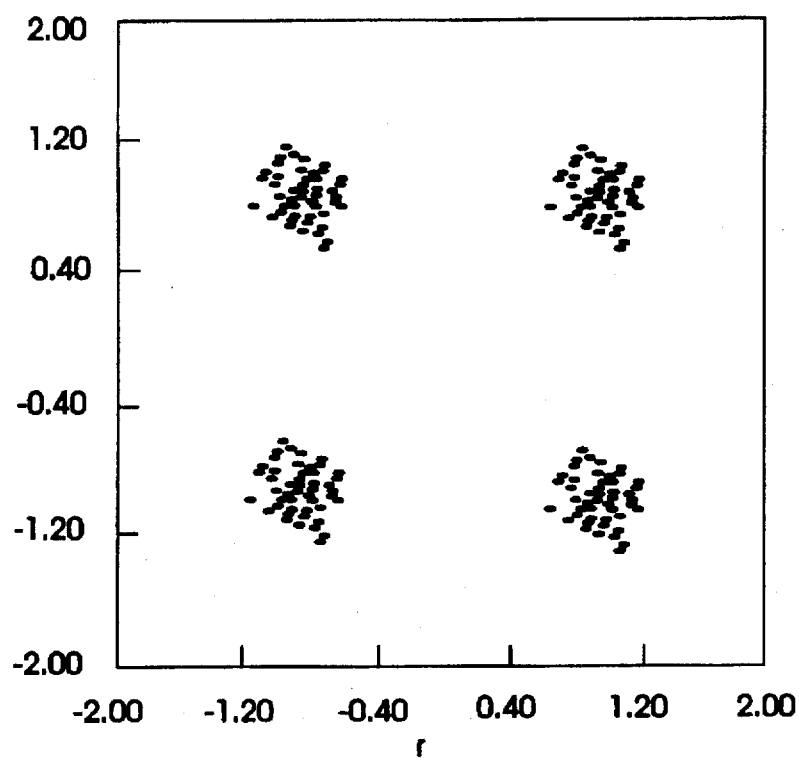
FIG. 8(c) shows the scatter diagram of the equalized signal using the present invention.
Figure 8D:
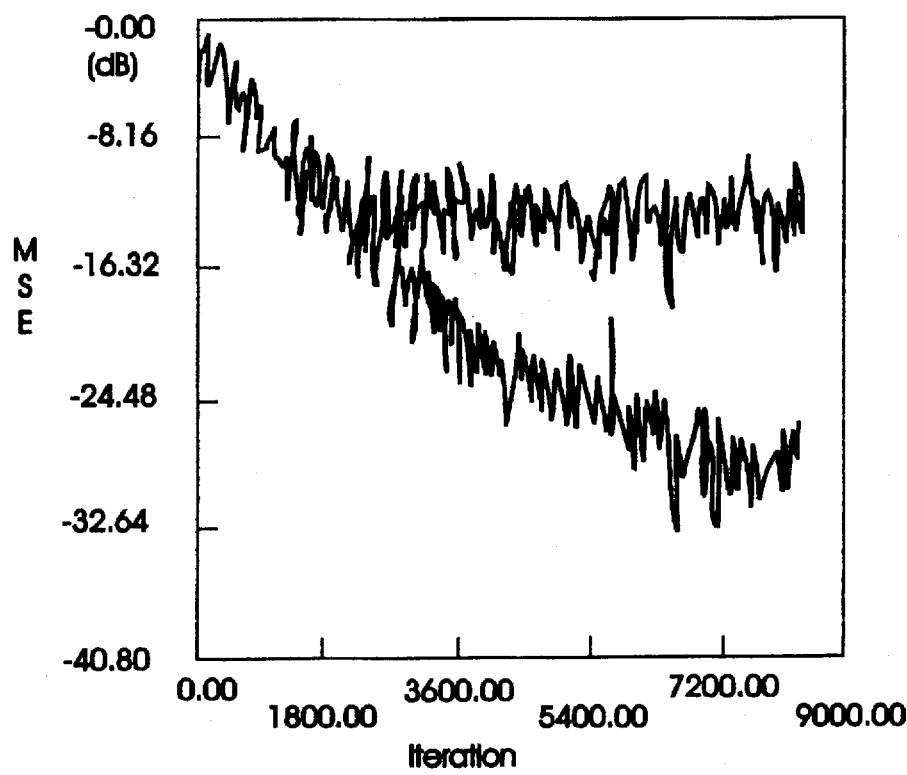
FIG. 8(d) shows the learning curves in terms of the mean square error (MSE).

FIG. 8(a) shows the scatter diagram of the distorted received signal before equalization. FIG. 8(b) depicts the scatter diagram of the equalized signal using the feed forward only blind equalization (FOBE). FIG. 8(c) shows the scatter diagram of the equalized signal using the present invention. As can be seen from the two figures the present invention yields a sharper signal constellation than the FOBE. Finally, the learning curves for each are represented in FIG. 8(d) in terms of the mean square error (MSE). As can be seen, the present invention attains about 15-dB improvement in the residual MSE than the FOBE.

V. ADVANTAGES AND CLOSING

The present invention provides for several significant advantages over prior art systems. The first advantage is that the present invention eliminates the need for the transmitter to provide a training sequence. This saves communication overhead and the need to retrain when channel conditions change. Due to the blind nature of the present invention and the trainer system, continuous self training is performed and therefore no external training is required.

A second advantage of the present invention is that it provides compensation for spectral nulls in the transmission channel without substantially increasing the level of noise in the system. This is accomplished by the feedback nature of the present invention. By using a DFE like structure, the trainee system avoids placing large gains in the received signal sequence to compensate for spectral nulls. Thus, the present invention provides a remedy to the inherent problem of noise, amplification for the equalization of channels containing spectral nulls.

A third advantage of the present invention is that it eliminates the problem of decision error propagation. Because the input to the FBF of the trainee system is the output of the trainer system, the decision error propagation loop of prior art systems is broken. The output of the trainee system is not feedback through the FBF. Therefore errors in the decision element are not propagated back through the equalizer. Also, the DDE of the trainer system operates and is adjusted independently of the output of the trainee system. Thus, the present invention provides a remedy to the decision error propagation problem that has plagued other prior art equalization techniques.

A forth advantage of the present invention is that it adapts to rapidly changing communications channel conditions. Thus, the present invention provides a very attractive solution for mobile communications applications where the challenging problem concerning reliable transmission of signals through rapidly changing multipath fading channels with deep spectral nulls had not been resolved.

A fifth advantage is that the parallel nature of the trainer and trainee systems permits efficient parallel processor implementations. With the emergence of Digital Signal Processing and parallel computing in general, comes the need to divide a solution into separate smaller problems that do not require a lot of interaction. The present invention with the independence of the trainer and the trainee systems lends itself to parallel processing implementations.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. An equalization apparatus for the equalization of electrical signals codified into symbols and transmitted on a transmission channel comprising:

a decision direct equalizer, having a first adaptive feed forward filter coupled to a first decision element, with a received symbol sequence as input to the first adaptive feed forward filter with the first decision element outputting a first assigned symbol sequence; and a modified decision feedback equalizer having a second adaptive feed forward filter, an adaptive feedback filter, and a second decision element, where the received symbol sequence is input to the second adaptive feed forward filter and where the first assigned symbol sequence is input to the adaptive feedback filter and where the second decision element provides a second assigned symbol sequence using only the combined output of the first adaptive feed forward filter and the adaptive feedback filter.

2. The equalization apparatus of claim 1 wherein each decision element is a slicer.

3. The equalization apparatus of claim 1 wherein the decision direct equalizer and the modified decision direct feedback equalizer are implemented in a digital signal processor.

4. The equalization apparatus of claim 1 wherein the second decision element of the modified decision feedback equalizer is a viterbi decoder.

* * * * *